US007810159B2

(12) United States Patent  (10) Patent No.: US 7,810,159 B2
Bowden et al.  (45) Date of Patent: Oct. 5, 2010

(54) METHODS, COMPUTER NETWORKS AND COMPUTER PROGRAM PRODUCTS FOR REDUCING THE VULNERABILITY OF USER DEVICES

(75) Inventors: Steve Bowden, Conyers, GA (US); Eric Aslaksen, Atlanta, GA (US); Spencer Ho, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1032 days.

(21) Appl. No.: 11/348,048

(22) Filed: Feb. 6, 2006

(65) Prior Publication Data

US 2006/0294587 A1  Dec. 28, 2006

Related U.S. Application Data

(60) Provisional application No. 60/690,352, filed on Jun. 14, 2005.

(51) Int. Cl.
*G06F 12/14* (2006.01)

(52) U.S. Cl. .................. 726/25; 726/3; 726/5; 726/22; 726/23; 726/24; 713/188

(58) Field of Classification Search ...................... 726/3, 726/5, 22–25; 713/188
See application file for complete search history.

(56) References Cited

U.S. PATENT DOCUMENTS

| 6,167,567 | A  | * | 12/2000 | Chiles et al. ................ 717/173 |
| 6,269,456 | B1 | * | 7/2001  | Hodges et al. ................ 714/38 |
| 6,763,403 | B2 | * | 7/2004  | Cheng et al. .................. 710/36 |
| 6,976,251 | B2 | * | 12/2005 | Meyerson .................... 717/173 |
| 2002/0078142 | A1 | * | 6/2002 | Moore et al. ................ 709/203 |
| 2002/0100035 | A1 | * | 7/2002 | Kenyon et al. .............. 717/168 |
| 2003/0131256 | A1 | * | 7/2003 | Ackroyd ..................... 713/201 |
| 2006/0080656 | A1 | * | 4/2006 | Cain et al. ................... 717/174 |
| 2006/0085852 | A1 | * | 4/2006 | Sima ........................... 726/22 |
| 2006/0101517 | A1 | * | 5/2006 | Banzhof et al. ............... 726/25 |
| 2006/0153208 | A1 | * | 7/2006 | Costanzo .................... 370/401 |

\* cited by examiner

*Primary Examiner*—Thanhnga B Truong
(74) *Attorney, Agent, or Firm*—Myers Bigel Sibley & Sajovec, P.A.

(57) ABSTRACT

Methods, computer networks, and computer program products that reduce the vulnerability of network user devices to security threats include scanning a user device connected to a network to determine whether the user device contains a particular version of an application; downloading the particular version of the application via the network in response to verifying that the user device does not contain the particular version of the application; installing the downloaded application on the user device; scanning the user device for security vulnerabilities; downloading a patch via the network in response to detecting a security vulnerability, wherein the patch is configured to remedy the security vulnerability; and executing the downloaded patch on the user device to remedy the detected security vulnerability.

13 Claims, 18 Drawing Sheets

Welcome back to Health Check!

Announcing Version 21

Look for some of these new features:

- Look for the smiley face!
    - The smiley face will confirm that your computer is cyber fit. If you do not see the smiley face, your computer may not be fit and you should run Health Check again.
    - If you are asked to restart your computer, be sure to run Health Check again.
- You may be asked to enter your UID or CUID. If you are prompted, please enter the appropriate UID or CUID.
- Health Check now checks your PC for the correct version of your anti-virus software and installs any necessary updates.

If this is your first visit to Health Check

Health Check is a security vulnerability detection tool designed to ensure that all computers within the BellSouth environment are protected from Internet-based security threats. This tool determines vulnerabilities by performing a series of tests that analyze the computers exposure to online threats and whether the computer has been updated with the latest Microsoft patches and service packs.

If vulnerabilities are found during these tests, Health Check automatically installs the appropriate security patches and service packs on the computer or instructs the user on what to do next. Listed below are a few items you need to be aware of prior to running Health Check:

- A security warning may open asking you to install Health Check. Please select 'Yes'.
- You may be required to restart your computer multiple times.
- Running Health Check may take from 5 minutes to 1 hour depending on the updates needed.
- Health Check will only work on computers running Windows XP, Windows 2000, or Windows NT.
- Health Check may run slower via VPN.
- You have successfully completed Health Check when you see the smiley face!
- If you encounter issues or have questions, please contact the TSC or your local help desk.

Patches and Service Packs are released periodically. Please run Health Check on the last week of each month or as requested by the Cyber Response Team.

<u>Click here to continue</u>

FIG. 3A

Health Check

— 350

Status

Downloading Windows XP SP1. Once this has installed, you will be prompted to reboot your computer to finish the Health Check process.

This process may take up to 30 minutes to complete depending on your workstation operating system and the network you are currently on.

Please Wait...

Progress
Overall Progress: — 352

| Scan My Computer | Restart |

Health Check

Status

Downloading Internet Explorer 6.0 SP1. Once this has installed, you will be prompted to reboot your computer to finish the Health Check process.

This process may take up to 30 minutes to complete depending on your workstation operating system and the network you are currently on.

Please Wait...

Progress
Overall Progress:

Scan My Computer    Restart

METHODS, COMPUTER NETWORKS AND COMPUTER PROGRAM PRODUCTS FOR REDUCING THE VULNERABILITY OF USER DEVICES

RELATED APPLICATION

This application claims the benefit of and priority to U.S. Provisional Patent Application No. 60/690,352 filed Jun. 14, 2005, the disclosure of which is incorporated herein by reference as if set forth in its entirety.

FIELD OF THE INVENTION

The present invention relates generally to computers and, more particularly, to systems, methods and computer program products for protecting computers from security threats.

BACKGROUND OF THE INVENTION

Devices connected to a public network, such as the Internet, may be vulnerable to attack from various damaging security threats transmitted via the network, such as viruses, worms, Trojan horses, and the like. Other security threats include denial of service attacks, which can overload servers and shut down services, and spyware which can invade the privacy of individuals and enterprises. These security threats may cause an enterprise to suffer financial loss, data loss and network device downtime if not dealt with promptly and effectively.

Unfortunately, combating security threats is becoming increasingly costly and time consuming for many enterprises. Many enterprises have technicians dedicated to the prevention of security threats and to post attack rehabilitation of computers and computer networks.

SUMMARY OF THE INVENTION

In view of the above discussion, methods, computer networks, and computer program products that reduce the vulnerability of network user devices to security threats are provided. According to some embodiments of the present invention, a method of reducing the vulnerability of network user devices to security threats includes scanning a user device connected to a network to determine whether the user device contains a particular version of an application; downloading the particular version of the application via the network in response to verifying that the user device does not contain the particular version of the application; installing the downloaded application on the user device; scanning the user device for security vulnerabilities; downloading a patch via the network in response to detecting a security vulnerability, wherein the patch is configured to remedy the security vulnerability; and executing the downloaded patch on the user device to remedy the detected security vulnerability.

According to some embodiments of the present invention, a user device establishes communications with a web site and the web site verifies that a user has logged onto the network with a valid user ID prior to scanning the user device. The web site gathers various information from the user device. Also, the web site also stores information about applications and/or patches downloaded to the user device. According to some embodiments of the present invention, downloading a particular version of an application includes downloading a service pack or patch for the application, and installing the service pack or patch on the user device.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Figure 1:
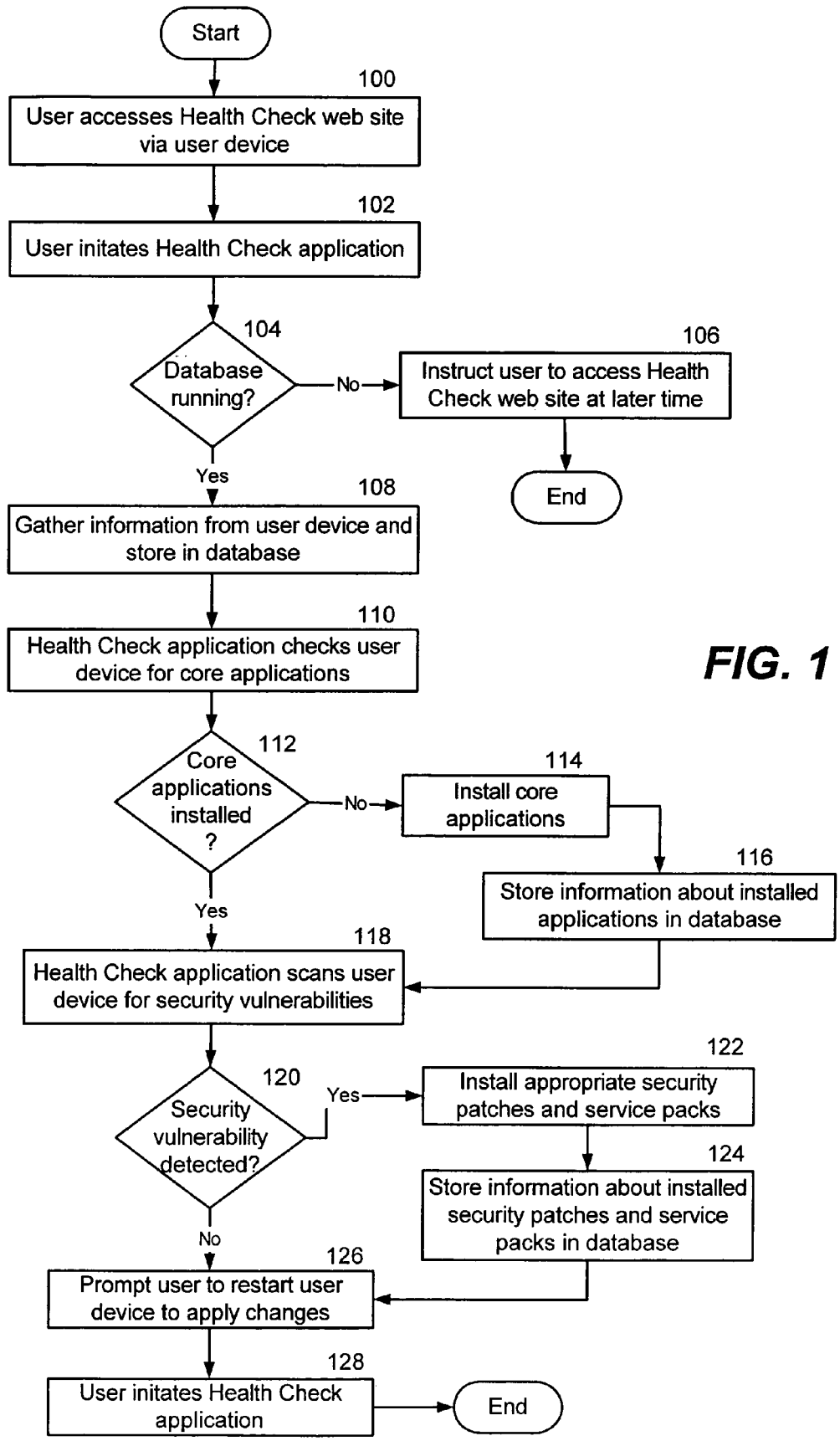
FIG. 1 is a flow chart of operations for protecting devices connected to networks from security threats, in accordance with some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

The present invention may be embodied as systems, computer networks, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, or communicate the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described herein with reference to flowchart and/or block diagram illustrations of methods, systems, computer networks, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The flowchart of FIG. 1 illustrates the architecture, functionality, and operations of some embodiments of methods, systems, computer networks, and computer program products for protecting devices connected to networks from security threats. In this regard, each block in the flow chart represents a module, segment, or portion of code, which comprises one or more executable instructions for implementing the specified logical function(s). It should also be noted that in other implementations, the function(s) noted in the blocks may occur out of the order described with respect to FIG. 1.

According to embodiments of the present invention, a user accesses a web site (hereinafter referred to as the "Health Check web site") that is in communication with a network via a device (hereinafter referred to as a "user device") (Block 100). The Health Check web site contains (or is in communication with) a database (hereinafter referred to as the "Health Check database") that maintains various information about a user and associated user device. A user device may be any device capable of communicating via a network including, but not limited to, a desktop computer, a laptop or notebook computer, a workstation, etc. Embodiments of the present invention are not limited to a particular type of user device.

The user then initiates an application that resides on the user device referred to as the "Health Check application" (Block 102). According to some embodiments of the present invention, the Health Check application is an executable program that resides on the user device. According to other embodiments of the present invention, the Health Check application is an ActiveX control that resides on the user device and that performs various functions described herein. An ActiveX control is a component program object that can be re-used by many application programs within a computer or among computers in a network. The technology for creating ActiveX controls is part of the Microsoft® Component Object Model (COM). ActiveX controls are well understood by those skilled in the art of the present invention and need not be described further herein.

The Health Check application initially checks with the Health Check database to see if the Health Check database is available (Block 104). If the Health Check database is unavailable, the user is instructed to access the Health Check web site later (Block 106) and program instructions are terminated. If the Health Check database is available, the Health Check application checks to see if the user device is running the most up-to-date version of the Health Check application. If not, the user is directed to download the latest version, either from the Health Check web site or from another source.

The Health Check application gathers various information from the user device and stores this information in the Health Check database (Block 108). Exemplary information includes, but is not limited to, device name, IP address of user device, user name, domain user is logged into, enterprise business unit, user device operating system, user device operating system service pack, user device browser version, user device application software versions, user device anti-virus software version, amount of free disk storage space on user device, date/time, etc.

Next, the Health Check application checks the user device for "core applications" (Block 110). Core applications are applications that an enterprise has determined that the user device should have and be capable of executing. Exemplary core applications include, but are not limited to, operating systems and operating system service packs and upgrades, browsers and browser service packs and upgrades, anti-virus programs and updates, etc. If a core application is not installed on the user device (Block 112), then the missing core application is downloaded and installed on the user device (Block 114). Although an entire application may be downloaded and installed, more commonly, a service pack or upgrade for an installed application is downloaded and installed on a user device. Information about the installed core application(s) is then stored in the Health Check database (Block 116).

Next, the Health Check application scans the user device for various security vulnerabilities (Block 118). This may include running non-operating system patches/applications on the user device. For example, a worm cleaner application (e.g., a Sasser worm cleaner, Beagle.AO cleaner, etc.) may be executed on the user device for the purpose of detecting and/or eradicating a worm on the user device. This may also include verifying whether the user device contains all security patches (i.e., searching the user device registry and files, etc.).

If a security vulnerability is detected (Block 120), the Health Check application installs and executes the appropriate security patch/service pack, etc. (Block 122). Exemplary patches include, but are not limited to, worm cleaners, hot fixes, security configuration utilities, security improvement utilities, and other executable programs/code etc. Information about installed security patches/service packs is then stored in the Health Check database (Block 124).

Next, the user is prompted to restart the user device to apply changes made to the user device (Block 126). According to some embodiments of the present invention, the user may then be prompted to run the Health Check application a second time to verify that the user device is protected (Block 128).

Although FIG. 1 illustrates an exemplary software architecture that may facilitate protecting user devices connected to networks from security threats, it will be understood that the present invention is not limited to such a configuration but is intended to encompass any configuration capable of carrying out the operations described herein. Computer program code for carrying out operations discussed above with respect to FIG. 1 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 2:
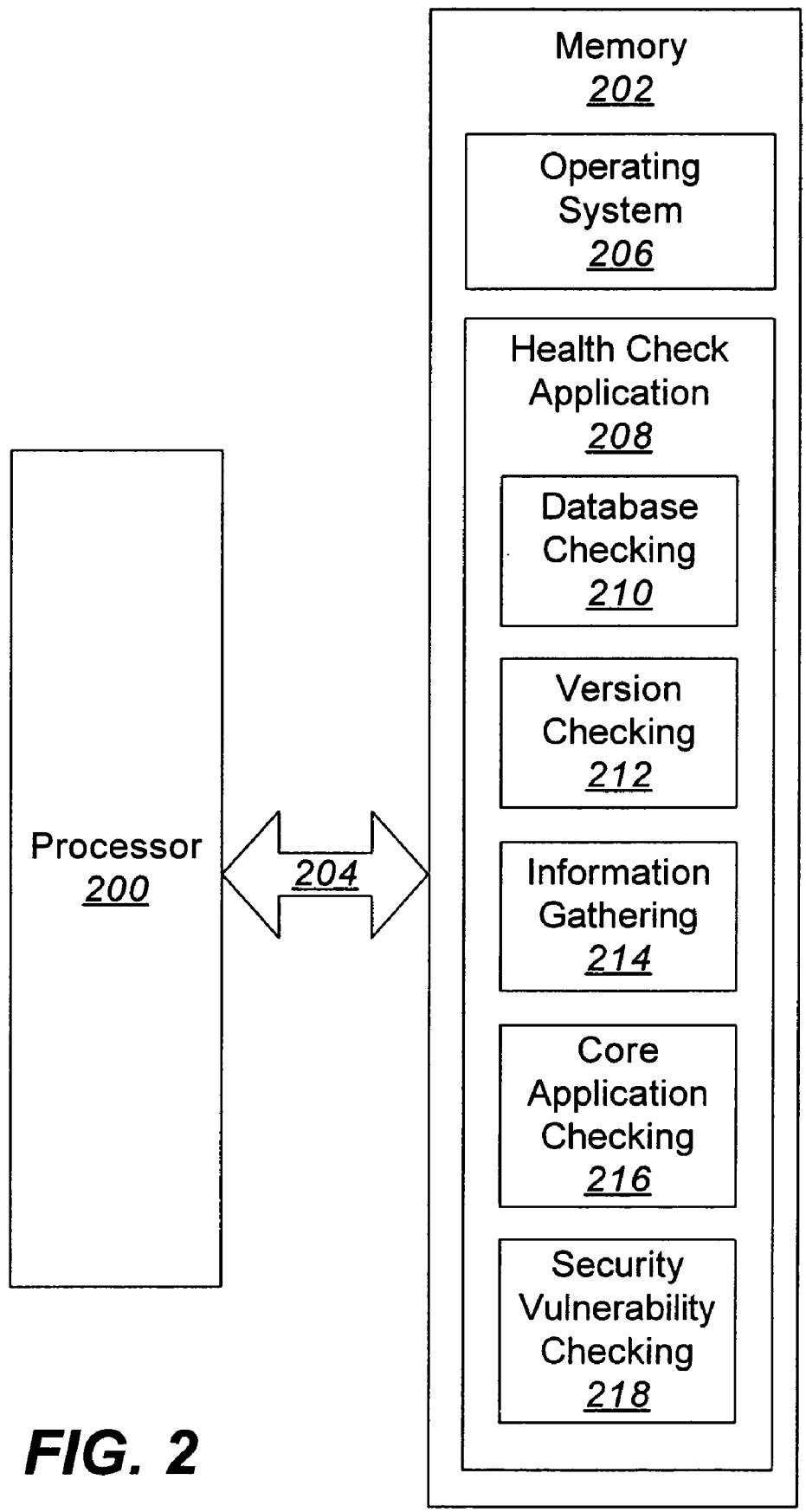
FIG. 2 is a block diagram that illustrates a software architecture for protecting devices connected to networks from security threats, in accordance with some embodiments of the present invention.

FIG. 2 illustrates a processor 200 and a memory 202 hosted by a user device that may be used in embodiments of methods, systems, computer networks, and computer program products for protecting devices connected to networks from security threats, according to the present invention. For example, in some embodiments of the present invention, the processor 200 and memory 202 may be used to embody the processors and the memories used to log on to the Health Check web site, to gather and store information in the Health Check database about the user and/or user device, to check the user device for core applications, to install core applications, to check the user device for security vulnerabilities, to install security patches/service packs, etc., and to store information in the Health Check database about installed security patches/service packs.

The processor 200 communicates with the memory 202 via an address/data bus 204. The processor 200 may be, for example, a commercially available or custom microprocessor. The memory 202 is representative of the overall hierarchy of memory devices containing the software and data used to execute the Health Check application as described herein, in accordance with some embodiments of the present invention. The memory 202 may include, but is not limited to, the following types of devices: cache, ROM, PROM, EPROM, EEPROM, flash, SRAM, and DRAM.

As shown in FIG. 2, the memory 202 may hold two or more major categories of software and data: an operating system 206 and the Health Check application (or ActiveX control) 208. The operating system 206 controls operations of the user device. In particular, the operating system 206 may manage the user device's resources and may coordinate execution of programs (e.g., the Health Check application) by the processor 200.

The Health Check application 208 includes various modules for carrying out the various operations thereof. For example, a database checking module 210 comprises logic for communicating with the Health Check database to see if the Health Check database is available and, if the Health Check database is unavailable, instructing a user to access the Health Check web site at a later time. A version checking module 212 comprises logic for checking whether a user device is running the most up-to-date version of the Health Check application and, if not, directing the user to download the latest version, either from the Health Check web site or from another source.

An information gathering module 214 comprises logic for gathering various information (e.g., device name, the user device operating system, etc.) from the user device and storing this information in the Health Check database.

A core application checking module 216 comprises logic for checking the user device for core applications and, if a core application is not installed on the user device, downloading and installing a core application(s) on the user device. The core application checking module 216 also comprises logic for storing Information about the installed core application(s) in the Health Check database.

A security vulnerability checking module 218 comprises logic for scanning a user device for various security vulnerabilities, including running non-operating system patches/applications on the user device and verifying whether the user device contains all required security patches, as described above. The security vulnerability checking module 218 also comprises logic for installing and executing the appropriate security patch/service pack, etc., if a security vulnerability is detected. Information about installed security patches/service packs is then stored in the Health Check database via the security vulnerability checking module 218.

Figure 3B:
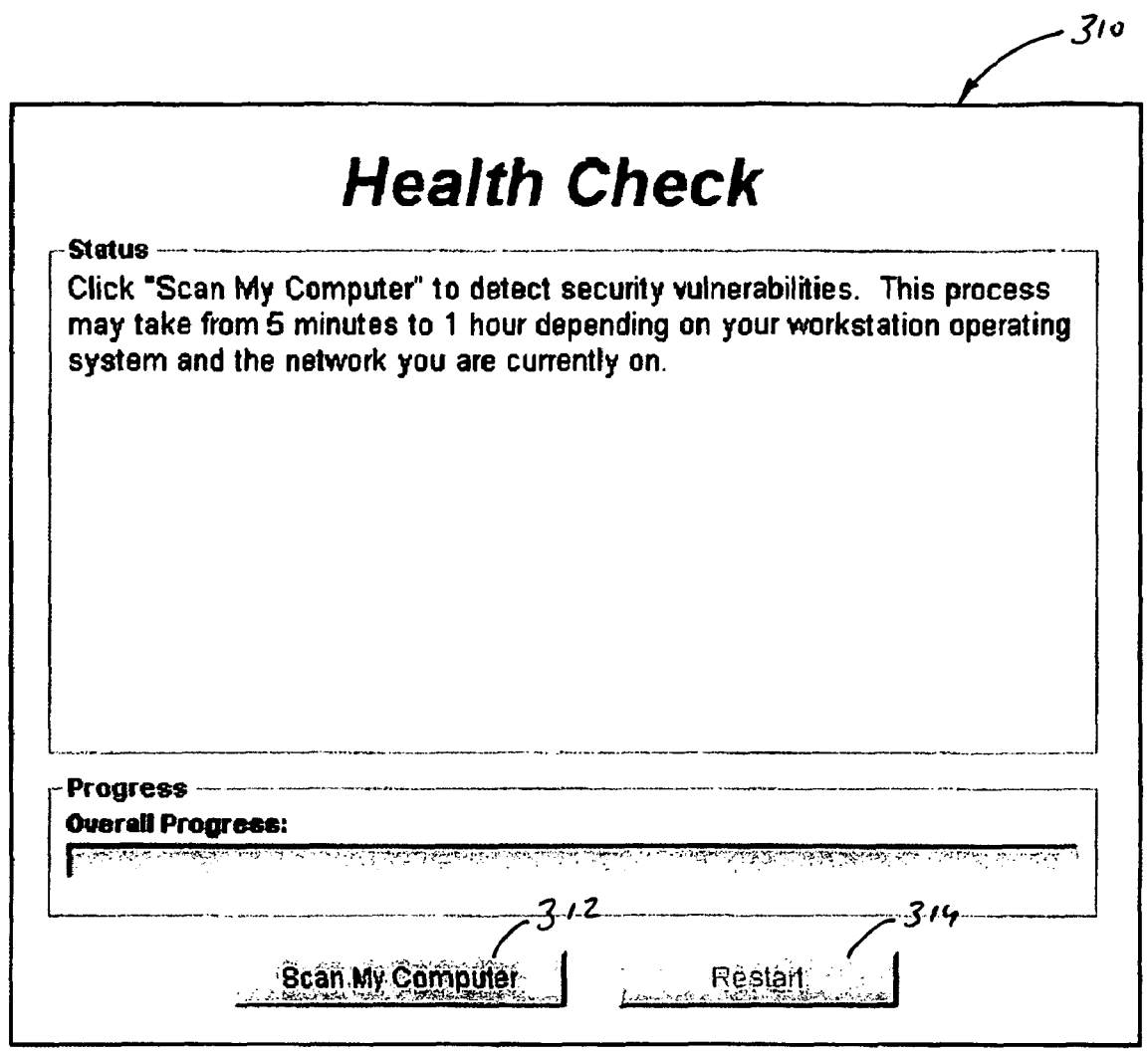
FIGS. 3A-3P are user interfaces that illustrate various embodiments of the present invention.
Figure 3C:
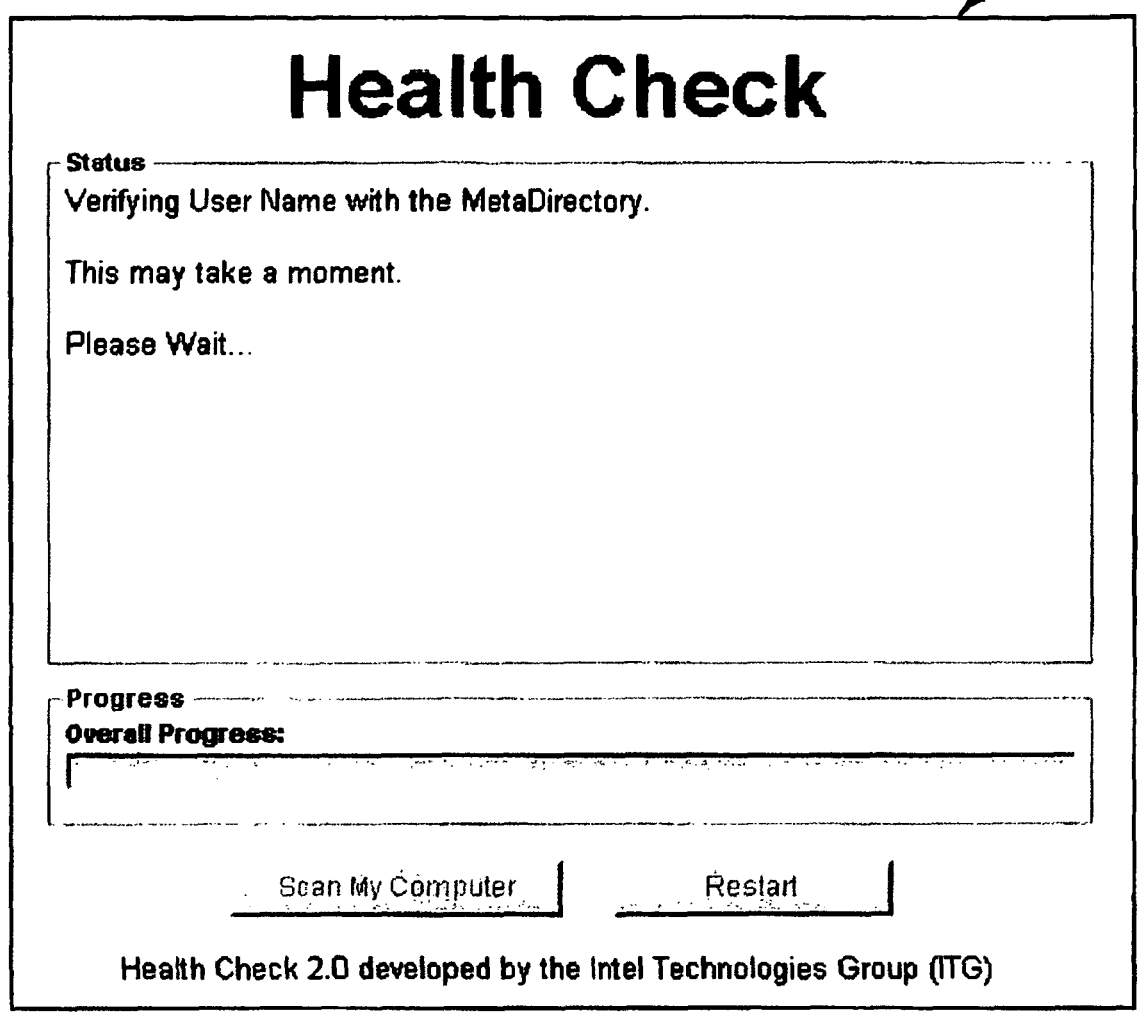
Figure 3D:
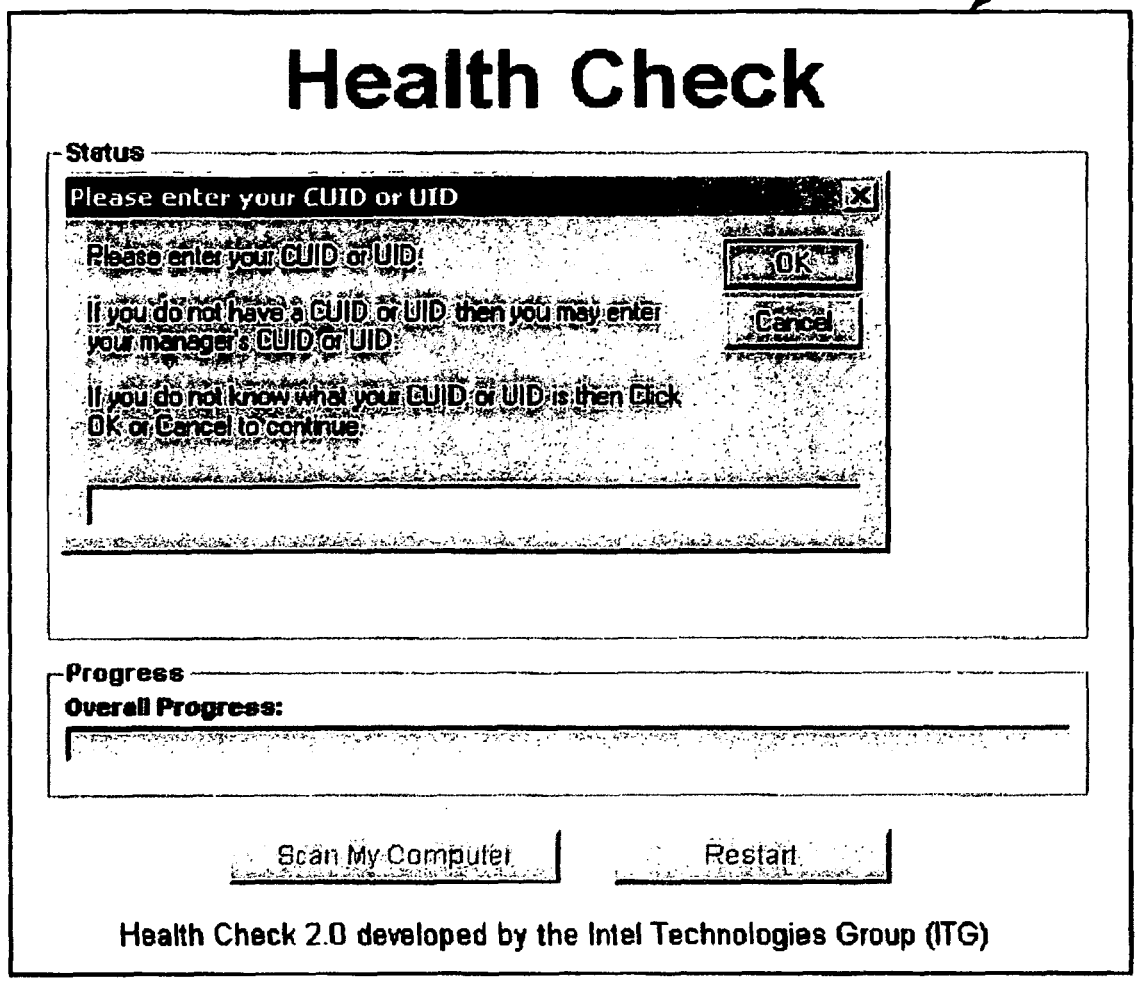
Figure 3E:
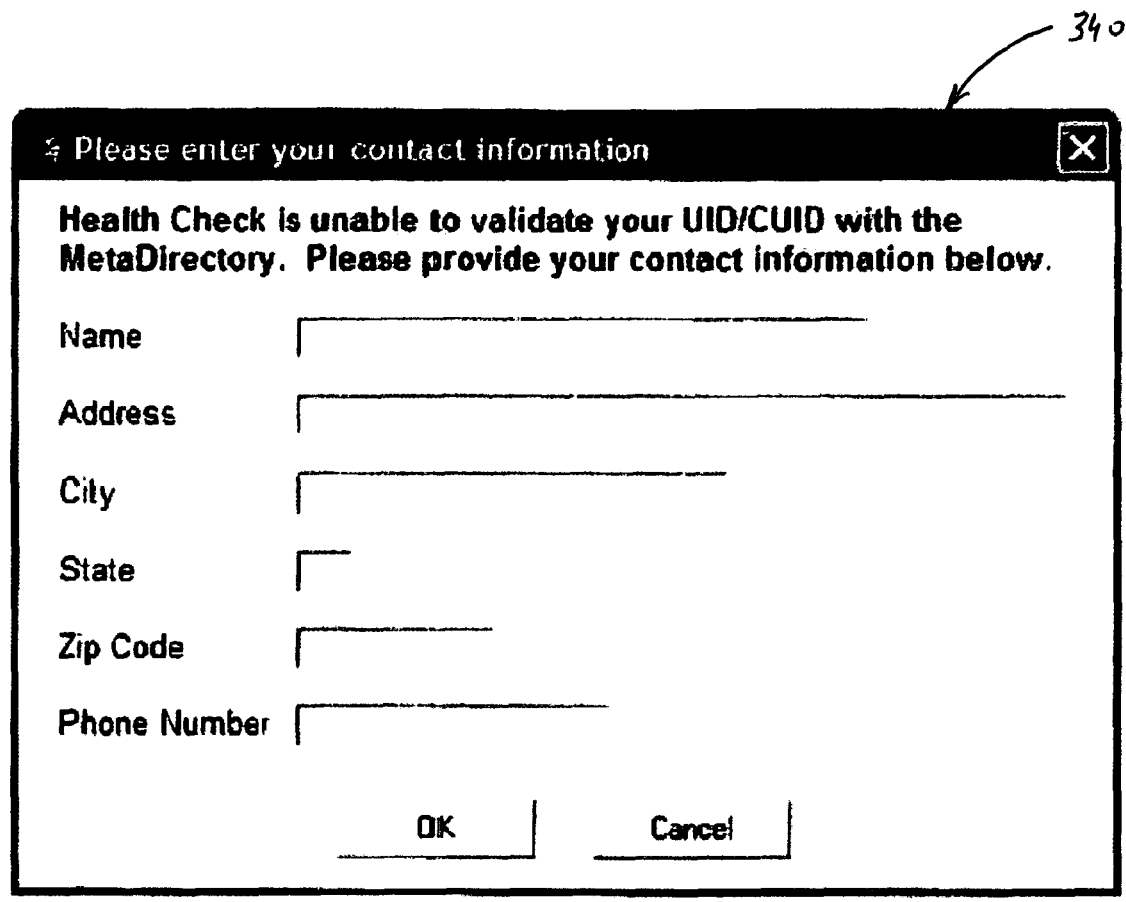
Figure 3F:
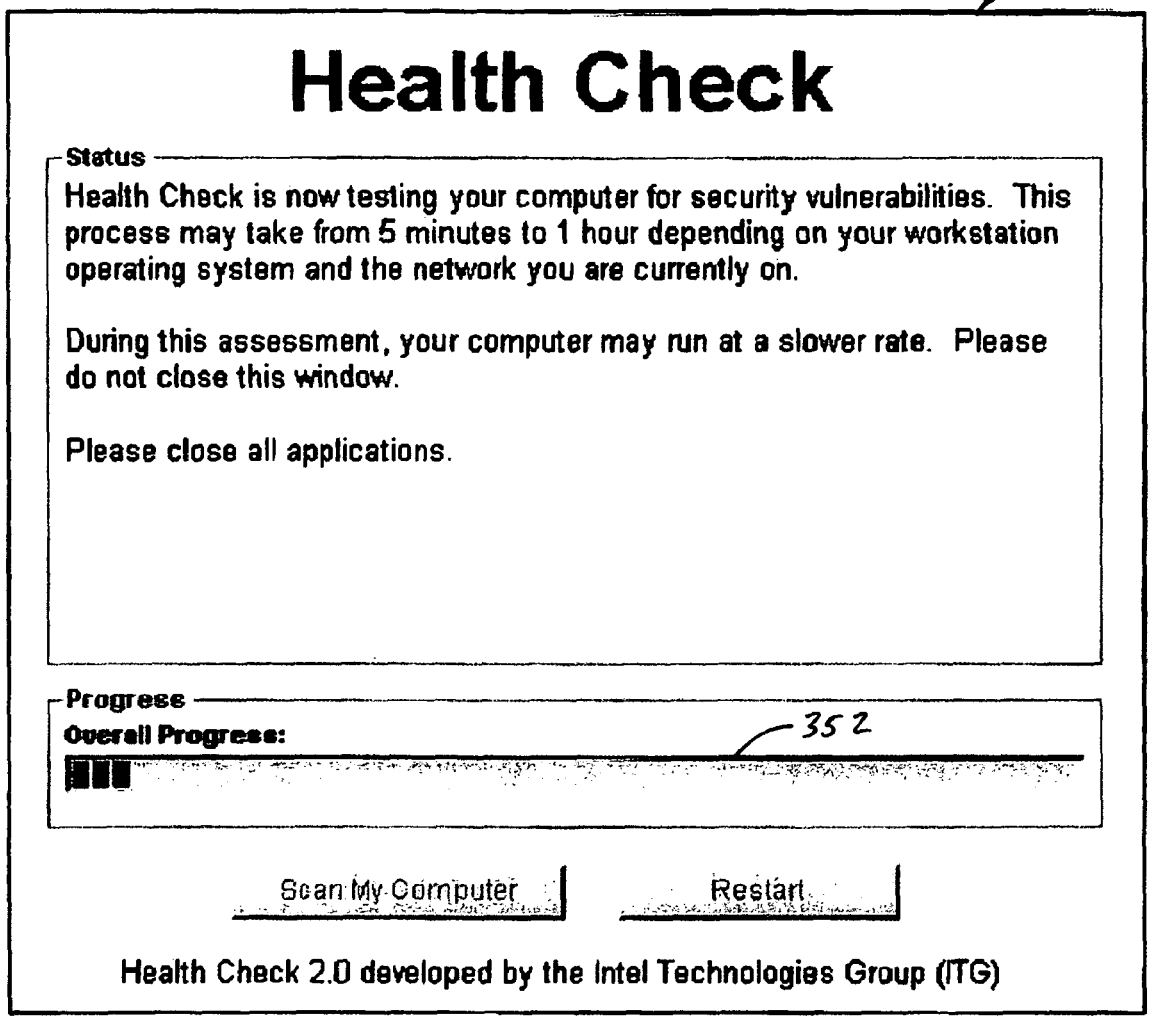
Figure 3G:
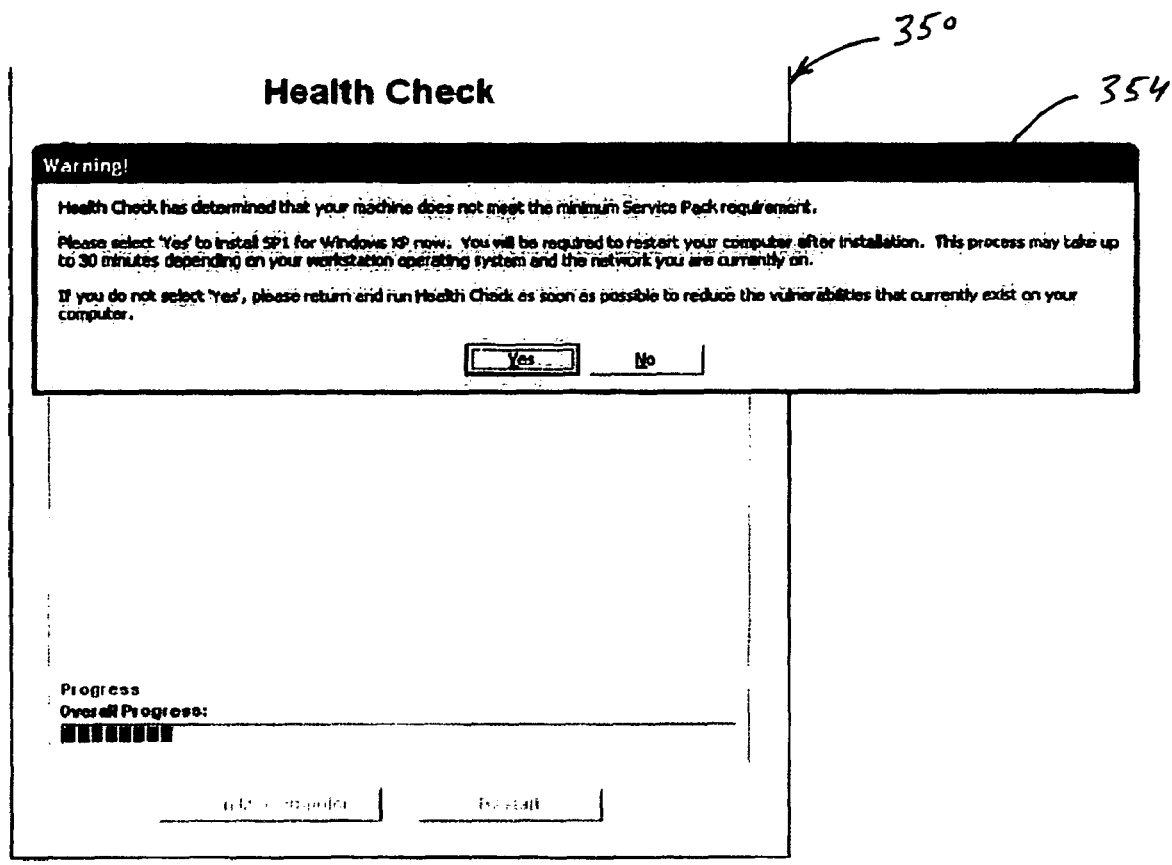
Figure 3H:
Figure 3I:
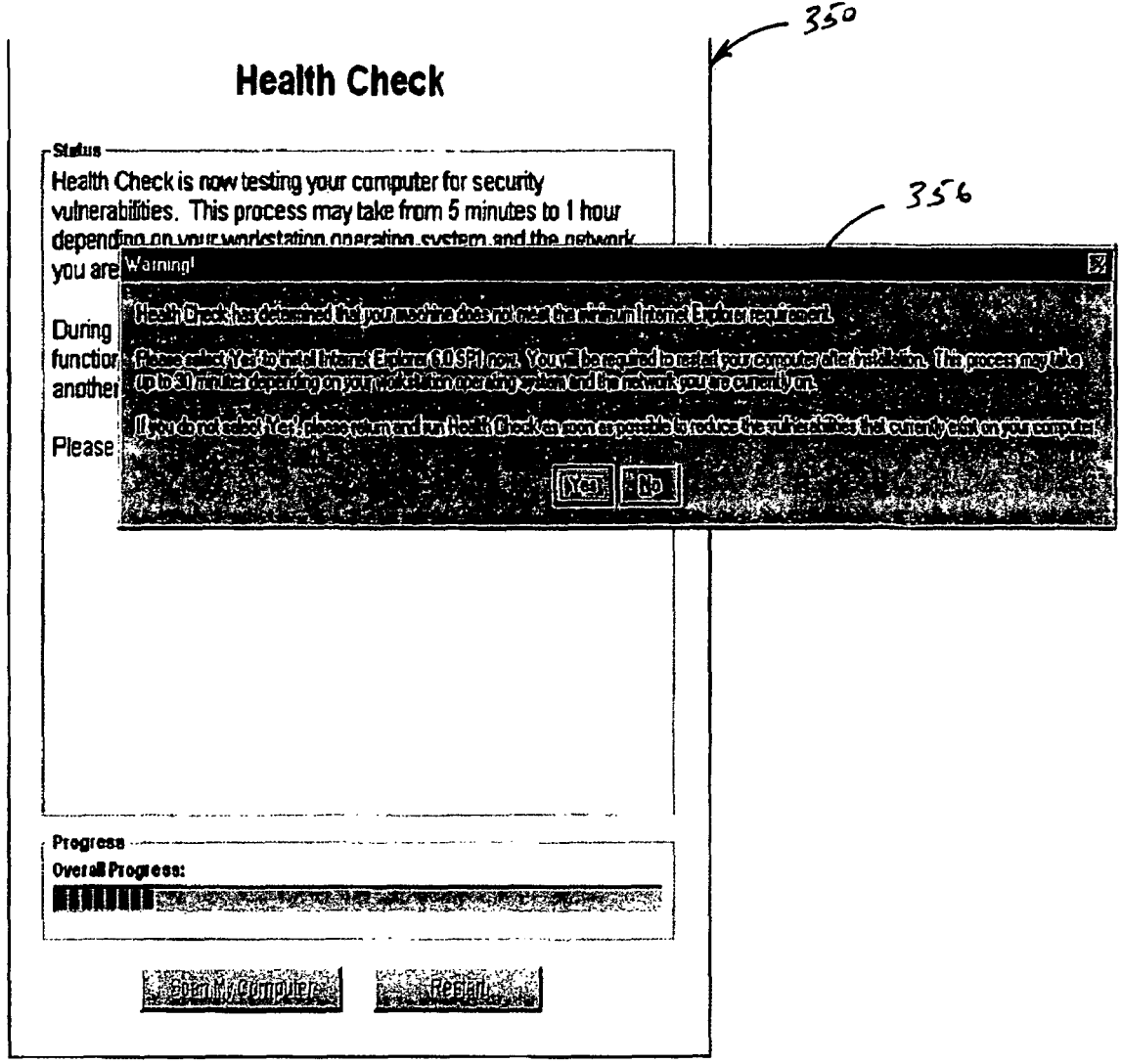
Figure 3J:
Figure 3K:
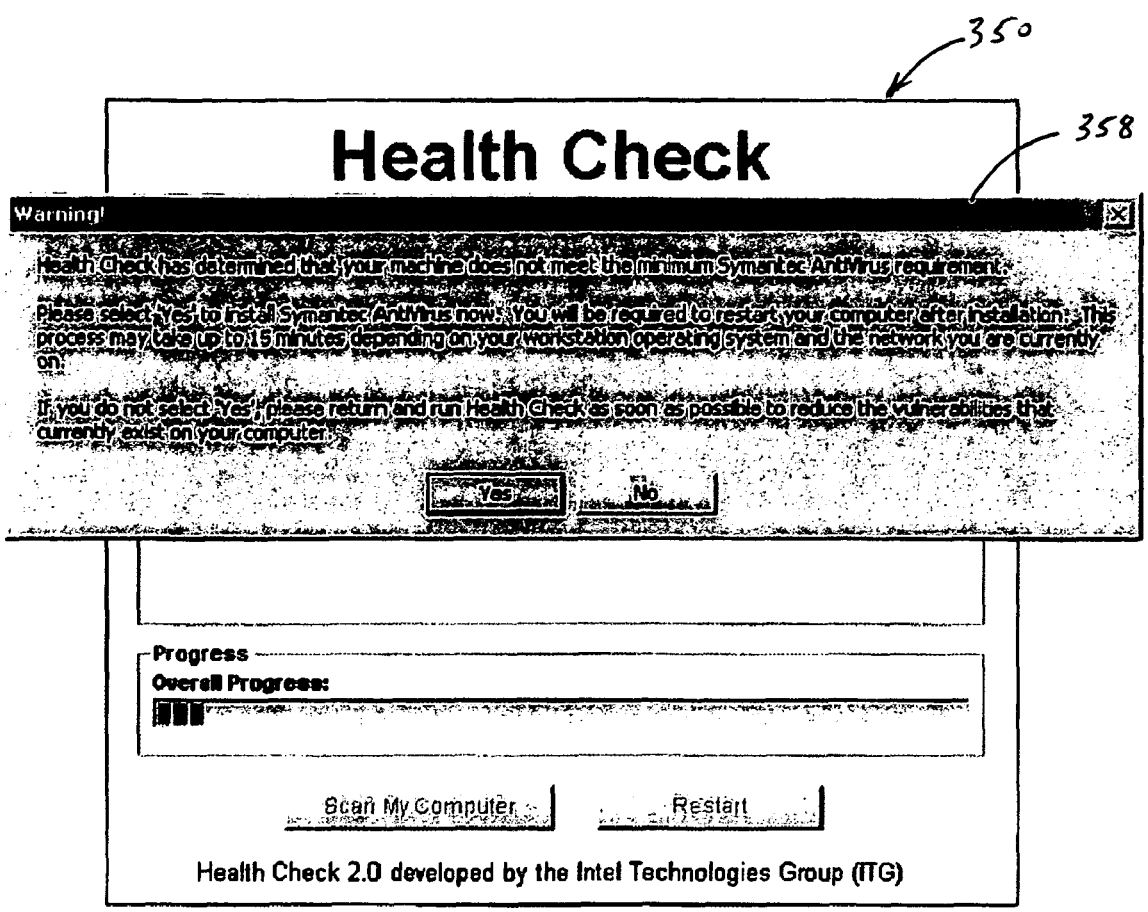
Figure 3L:
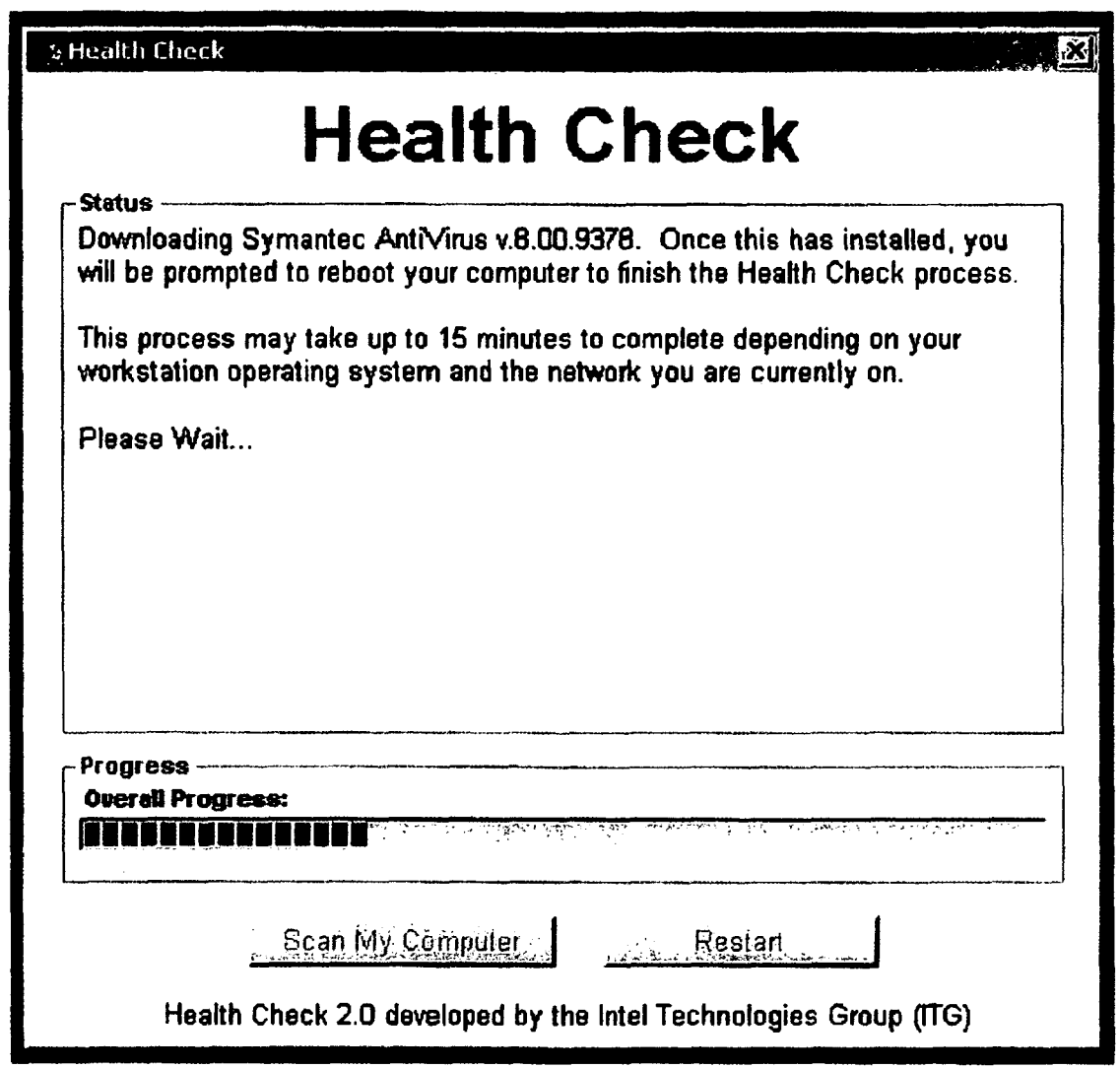
Figure 3M:
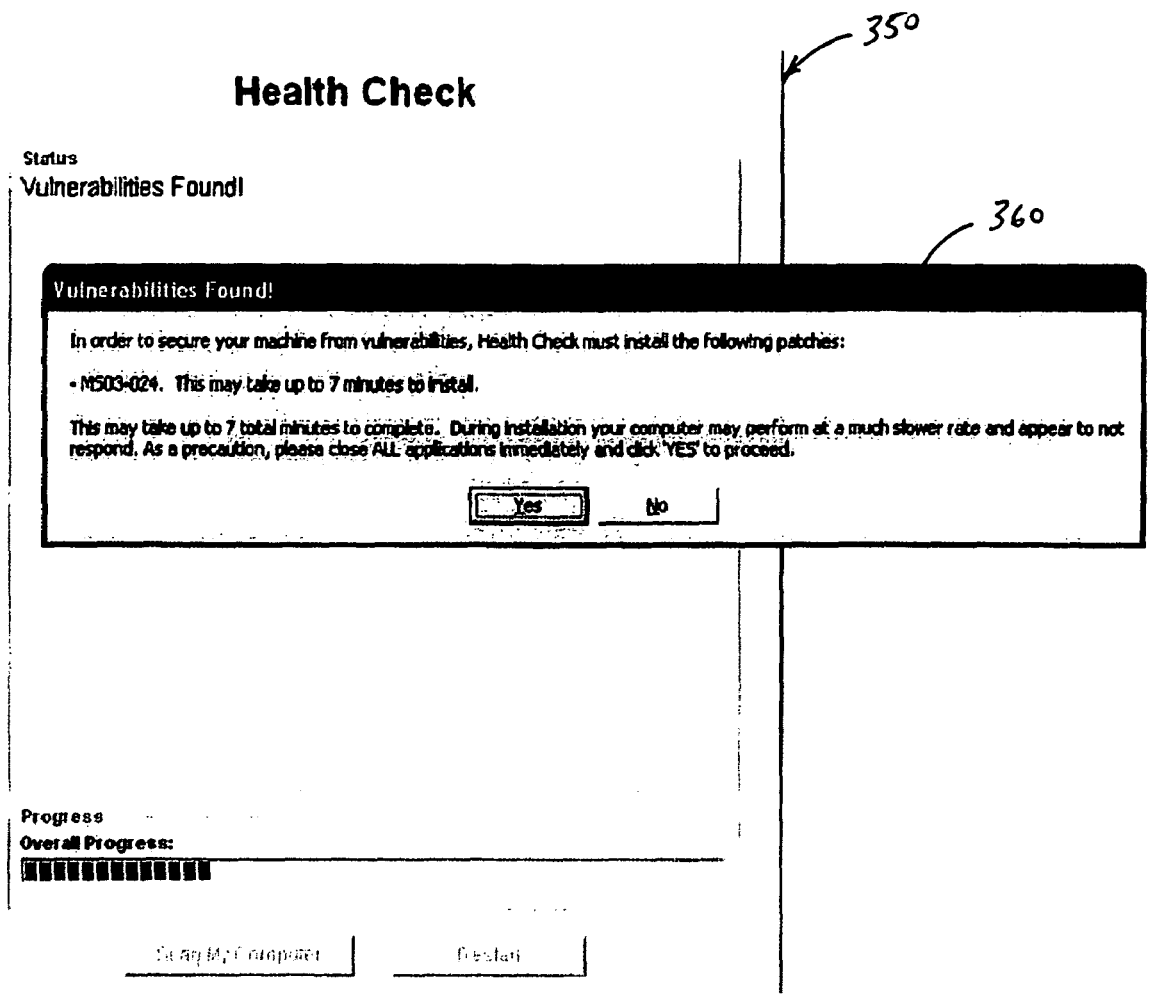
Figure 3N:
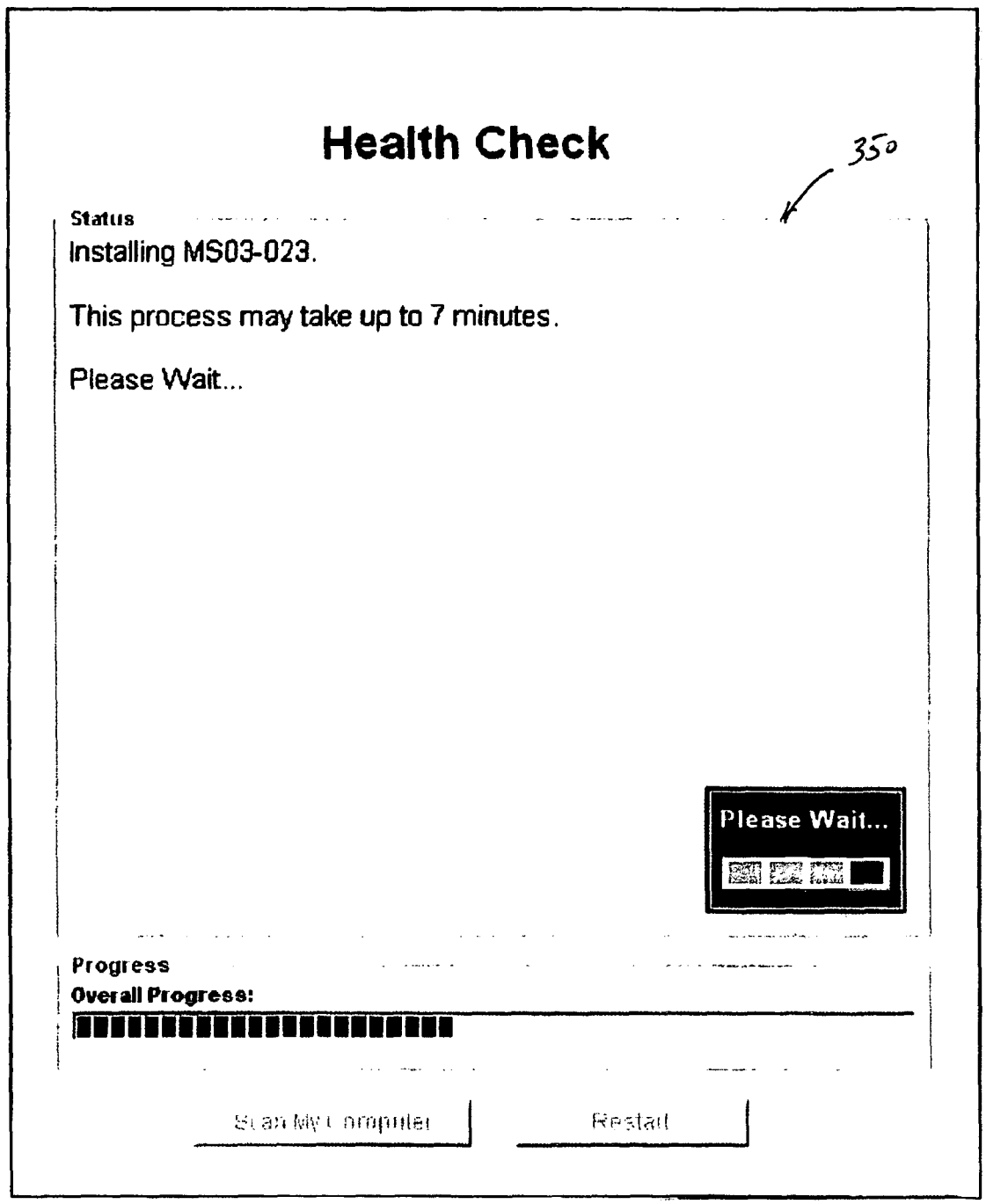
Figure 3O:
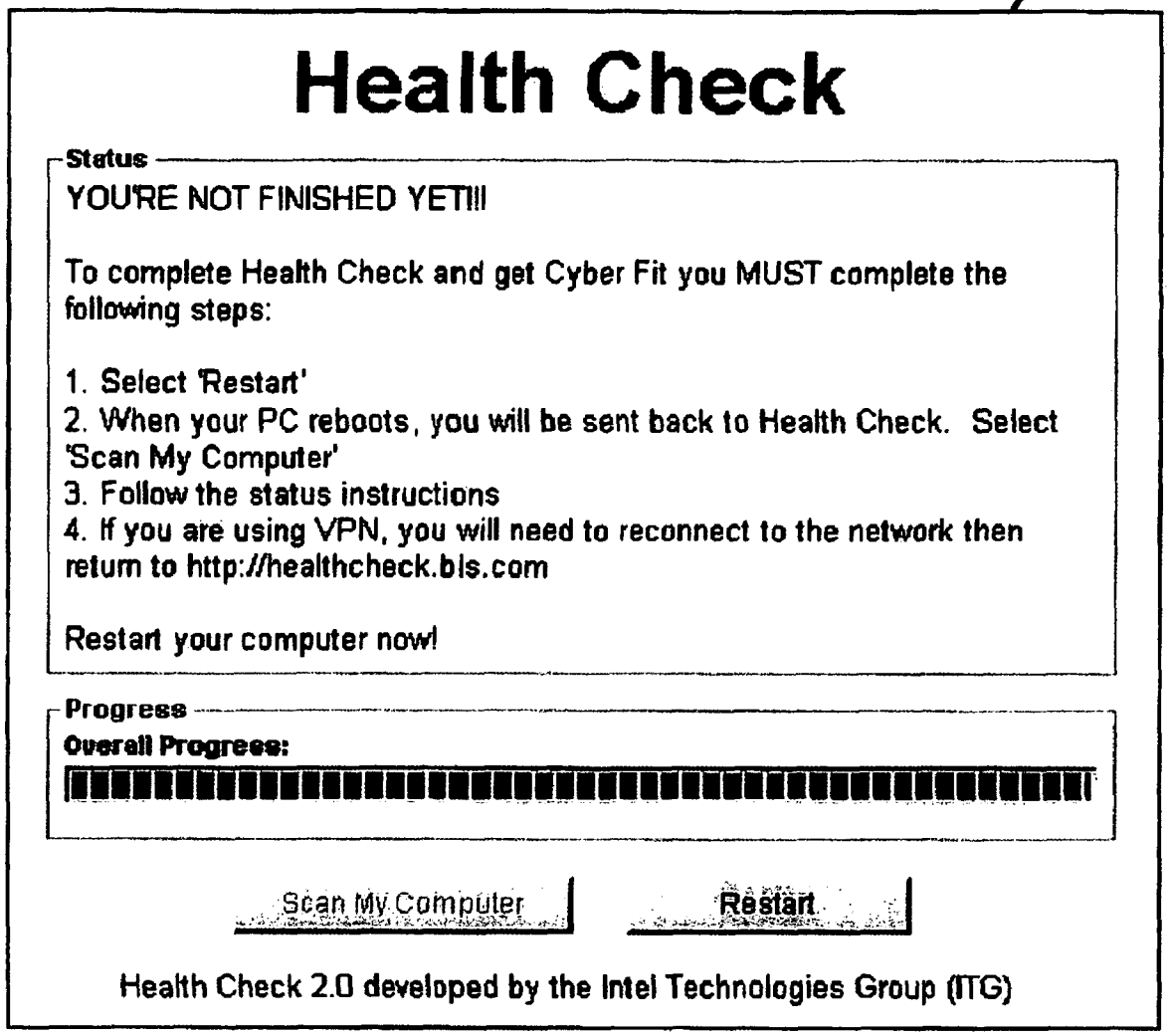
Figure 3P:
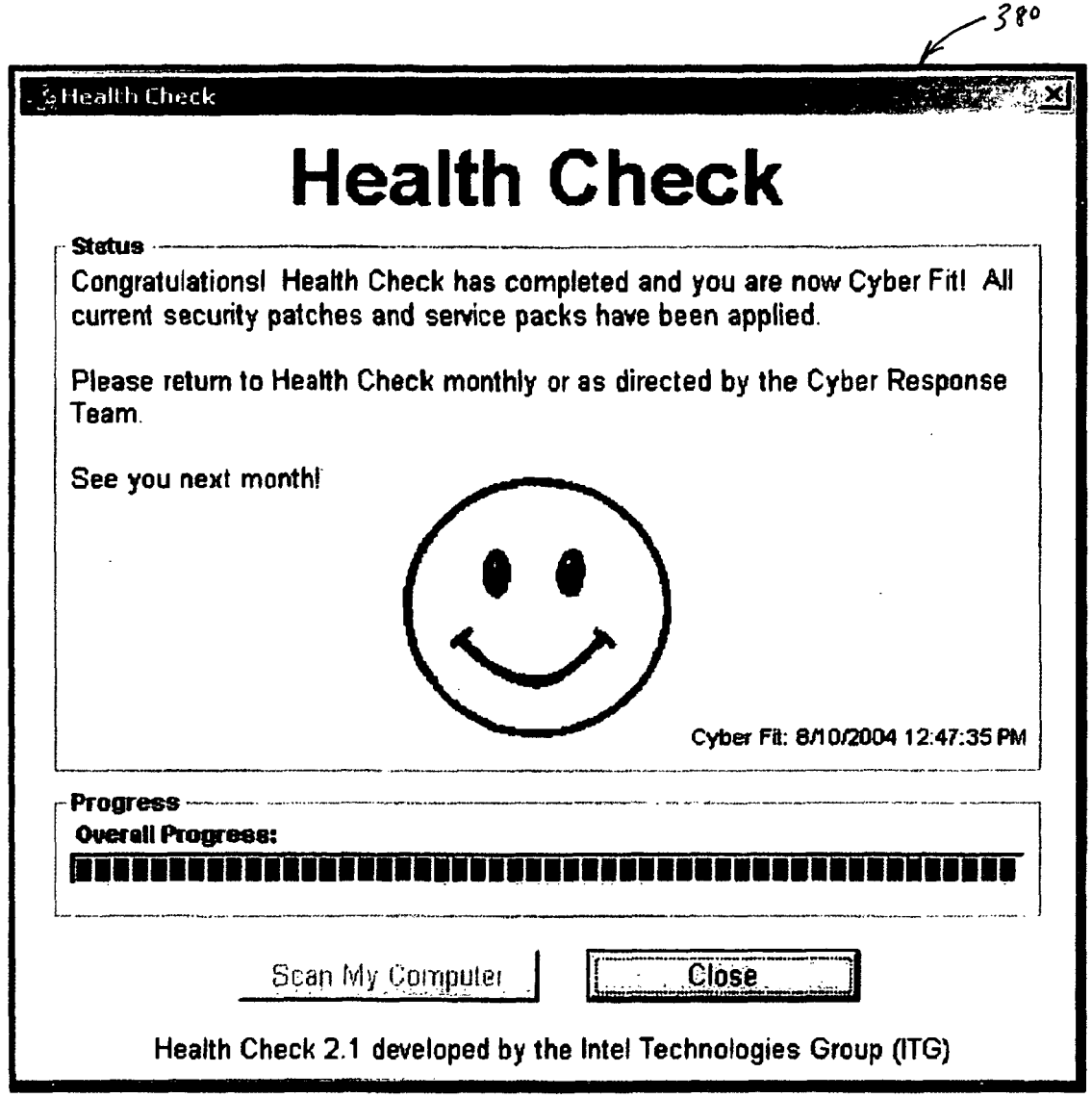

FIGS. 3A-3P, are exemplary user interfaces that are displayed by a user device during implementation of some embodiments of the present invention. When a user accesses the Health Check web site via a browser executing on a user device, the user interface 300 of FIG. 3A is displayed initially. The user interface 300 includes a link 302, entitled "Click here to continue" that, upon use activation, displays the user interface 310 illustrated in FIG. 3B.

User interface 310 includes an activatable button 312 entitled "Scan My Computer" and an activatable button 314 entitled "Restart". When the "Scan My Computer" button 312 is activated by a user, the Health Check application verifies if the currently logged-in user ID is a valid user ID and displays user interface 320 of FIG. 3C as this takes place. If the user ID is valid, the Health Check application proceeds with scanning the user device. If the user ID is not valid, the Health Check application prompts the user to enter a valid user ID via user interface 330 of FIG. 3D. The user can either enter his/her own user ID, the user ID of another person (e.g., the user ID of the user's manager, etc.) or an invalid user ID. Alternatively, the user can click OK or Cancel without entering a user ID. If the user enters an invalid user ID or clicks OK without entering anything, the Health Check application uses the user ID with which the user logged into the user device with and continues to perform various functions (scanning for security vulnerabilities, loading patches, etc.). If the user clicks Cancel, the Health Check application will exit and operations terminate.

If a user enters an invalid user ID in the user interface 330 of FIG. 3D, an input box 340 is displayed, as illustrated in FIG. 3E, which asks the user for contact information. According to some embodiments of the present invention, contact information provided by a user via input box 340 is not validated. If the user clicks Cancel, the Health Check application uses the local login name of the system as the valid owner of the user device and continues normally. Entered contact information is not written to the Health Check database unless the user clicks OK.

Once the Health Check application verifies that the currently logged in user ID is valid, the Health Check application begins scanning the user device for core applications and for any security vulnerabilities, as described above, and the user interface 350 of FIG. 3F is displayed. The illustrated user interface 350 includes messages directed to the user and also includes a progress bar 352 that indicates the progress of the Health Check application. As described above, the Health Check application scans the user device for all appropriate operating system and application service packs/patches. If all patches are present, no further action is required.

If one or more core applications and/or service packs/patches are not currently installed on the user device, the user is instructed on how to install the latest version of the missing application and/or service pack/patch. For example, in FIG. 3G, the Health Check application has determined that the user device does not meet the minimum operating system service pack requirement and prompts the user with box 354 to install the service pack. As illustrated in FIG. 3H, the user has instructed the Health Check application to download and install the service pack and the Health Check application provides various messages regarding the installation in the user interface 350.

In FIG. 3I, the Health Check application has determined that the user device does not meet the minimum user device browser requirement and prompts the user with box 356 to install an upgrade/service pack for the browser. As illustrated in FIG. 3J, the user has instructed the Health Check application to download and install the browser upgrade/service pack and the Health Check application provides various messages regarding the installation in the user interface 350.

In FIG. 3K, the Health Check application has determined that the user device does not meet the minimum user device anti-virus software requirement and prompts the user with box 358 to install an anti-virus application or an upgrade/service pack for an anti-virus application. As illustrated in FIG. 3L, the user has instructed the Health Check application to download and install the anti-virus application or an upgrade/service pack for an anti-virus application and the Health Check application provides various messages regarding the installation in the user interface 350.

In FIG. 3M, the Health Check application has determined that the user device contains a security vulnerability and prompts the user with box 360 to install a patch. As illustrated in FIG. 3N, the user has instructed the Health Check application to download and install the patch and the Health Check application provides various messages regarding the installation in the user interface 350.

Once all core applications, service packs/patches and security patches have been installed on the user device, the user interface 370 of FIG. 3O is displayed. User interface 370 instructs the user to restart the user device and to run the Health Check application again. Once the user device has restarted and the Health Check application has been run, the user interface 380 of FIG. 3P is displayed. User interface 380 indicates that the user device is protected from various security threats.

Many variations and modifications can be made to the preferred embodiments without substantially departing from the principles of the present invention. All such variations and modifications are intended to be included herein within the scope of the present invention, as set forth in the following claims.

That which is claimed is:

1. A method of reducing the vulnerability of network user devices to security threats, comprising:
   establishing communications between a user device connected to a network and a web site on the network;
   executing a health check application residing on the user device that gathers information from the user device and sends the gathered information to the web site;
   scanning the user device via the health check application to determine whether the user device contains a particular version of one or more core applications;
   downloading the particular version of the one or more core applications via the network in response to verifying that the user device does not contain the particular version of the one or more core applications;
   installing the downloaded one or more core applications on the user device;
   scanning the user device via the health check application for security vulnerabilities;
   downloading a patch via the network in response to detecting a security vulnerability, wherein the patch is configured to remedy the security vulnerability;
   executing the downloaded patch on the user device to remedy the detected security vulnerability;
   sending to the web site, via the health check application, information about any applications and patches downloaded to the user device.

2. The method of claim 1, wherein downloading the particular version of the one or more core applications comprises downloading one or more service packs or patches, and wherein installing the downloaded one or more core applications on the user device comprises installing the one or more service packs or patches on the user device.

3. The method of claim 1, further comprising verifying, via the web site, that a user has logged onto the network with a valid user ID prior to scanning the user device.

4. The method of claim 1, further comprising prompting a user via the health check application to restart the user device after installing the downloaded application and after executing the downloaded patch.

5. The method of claim 1, wherein core applications are selected from the group consisting of: operating systems, browsers, and anti-virus programs.

6. The method of claim 1, wherein the downloaded patch comprises an executable program selected from the group consisting of: worm cleaners, hot fixes, security configuration utilities, security improvement utilities.

7. A network user device, comprising:
   a processor;
   memory coupled to the processor; and
   a computer program residing in the memory that, when executed by the processor, causes the processor to perform the following:
   establish communications between a user device connected to a network and a web site on the network;
   execute a health check application residing on the user device that gathers information from the user device and sends the gathered information to the web site;
   scan the user device to determine whether the user device contains a particular version of one or more core applications;
   download the particular version of one or more core applications via the network in response to verifying that the user device does not contain the particular version of the one or more core applications;

install the downloaded one or more core applications on the user device;

scan the user device for security vulnerabilities;

download a patch via the network in response to detecting a security vulnerability, wherein the patch is configured to remedy the security vulnerability;

execute the downloaded patch on the user device to remedy the detected security vulnerability; and send to the web site information about any applications and patches downloaded to the user device.

8. The network user device of claim 7, wherein the computer program that causes the processor to download the particular version of one or more core applications comprises computer program that causes the processor to download one or more service packs or patches, and wherein the computer program that causes the processor to install the downloaded one or more core applications on the user device comprises computer program that causes the processor to install the one or more service packs or patches on the user device.

9. The network user device of claim 7, wherein the computer program further causes the processor to prompt a user to restart the user device after installing an application and after executing a downloaded patch.

10. The network user device of claim 7, wherein core applications are selected from the group consisting of: operating systems, browsers, and anti-virus programs.

11. The network user device of claim 7, wherein the downloaded patch comprises an executable program selected from the group consisting of: worm cleaners, hot fixes, security configuration utilities, security improvement utilities.

12. A computer program product for reducing the vulnerability of network user devices to security threats, comprising a computer readable medium having computer readable program code embodied therein that, when executed by a processor, cause the processor to perform the following steps:

establish communications between a user device connected to a network and a web site on the network;

execute a health check application residing on the user device that gathers information from the user device and sends the gathered information to the web site;

scan the user device via the health check application to determine whether the user device contains a particular version of one or more core applications;

download the particular version of the one or more core applications via the network in response to verifying that the user device does not contain the particular version of the one or more core applications;

install the downloaded one or more core applications on the user device;

scan the user device via the health check application for security vulnerabilities;

download a patch via the network in response to detecting a security vulnerability, wherein the patch is configured to remedy the security vulnerability;

execute the downloaded patch on the user device to remedy the detected security vulnerability; and send to the web site, via the health check application, information about any applications and patches downloaded to the user device.

13. A method of reducing the vulnerability of network user devices to security threats, comprising:

establishing communications between a user device connected to a network and a health check web site on the network;

executing a health check application residing on the user device that gathers information from the user device and sends the gathered information to the health check web site;

scanning the user device via the health check application to determine whether the user device contains a particular version of one or more core applications, wherein the core applications are selected from the group consisting of: operating systems, browsers, and anti-virus programs;

downloading the particular version of the one or more core applications via the network in response to verifying that the user device does not contain the particular version of the one or more core applications;

installing the downloaded one or more core applications on the user device;

scanning the user device via the health check application for security vulnerabilities;

downloading a patch via the network in response to detecting a security vulnerability, wherein the patch is configured to remedy the security vulnerability;

executing the downloaded patch on the user device to remedy the detected security vulnerability; and sending to the health check web site, via the health check application, information about any applications and patches downloaded to the user device.

* * * * *